United States Patent
Madison et al.

(10) Patent No.: US 8,897,113 B2
(45) Date of Patent: *Nov. 25, 2014

(54) ROTARY HEAD DATA STORAGE AND RETRIEVAL SYSTEM AND METHOD FOR DATA VERIFICATION

(71) Applicant: Oracle International Corporation, Redwood City, CA (US)

(72) Inventors: Carl Madison, Windsor, CO (US); Timothy C. Ostwald, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,712

(22) Filed: Nov. 7, 2012

(65) Prior Publication Data

US 2014/0126344 A1    May 8, 2014

(51) Int. Cl.
| | | |
|---|---|---|
| *G11B 20/18* | (2006.01) | |
| *G11B 7/003* | (2006.01) | |
| *G11B 7/006* | (2006.01) | |
| *G11B 7/0045* | (2006.01) | |
| *G11B 7/14* | (2012.01) | |

(52) U.S. Cl.
CPC ............. *G11B 20/1879* (2013.01); *G11B 7/14* (2013.01); *G11B 7/006* (2013.01); *G11B 7/0031* (2013.01); *G11B 7/00458* (2013.01)
USPC ..................... 369/53.35; 369/13.37; 720/658; 720/746

(58) Field of Classification Search
USPC ........ 369/13.37, 53.35; 360/78.02, 83, 251.1, 360/271, 134, 53; 720/658, 746
See application file for complete search history.

(56) References Cited

U.S. PATENT DOCUMENTS

| | | | |
|---|---|---|---|
| 2,866,012 A | | 12/1958 | Ginsburg et al. |
| 4,970,707 A | * | 11/1990 | Hara et al. ................. 369/44.11 |
| 5,331,490 A | | 7/1994 | Richards et al. |
| 5,343,338 A | | 8/1994 | Murata et al. |
| 5,404,348 A | | 4/1995 | Terao et al. |

(Continued)

FOREIGN PATENT DOCUMENTS

| | | |
|---|---|---|
| DE | 202265 | 11/1971 |
| DE | 2203840 | 8/1973 |

(Continued)

OTHER PUBLICATIONS

Quadruplex videotape, Wikipedia.org, Mar. 30, 2011, pp. 1-3.

(Continued)

*Primary Examiner* — Thomas Alunkal
(74) *Attorney, Agent, or Firm* — Brooks Kushman P.C.

(57) ABSTRACT

A data storage and retrieval system includes a head carriage unit adapted for rotational motion and having multiple heads disposed at a working surface. The system also includes a tape drive unit configured to move a tape media past the working surface of the head carriage unit, the tape media having a width approximately equal to a width of the working surface. As the head carriage unit rotates and the tape moves past the working surface, a first head is configured to write a data track to the tape and a second head is configured to thereafter read the data track, where data read by the second head is for use in verifying data integrity and performing error correction.

18 Claims, 3 Drawing Sheets

(56) References Cited

U.S. PATENT DOCUMENTS

| | | | |
|---|---|---|---|
| 5,450,228 | A | 9/1995 | Boardman et al. |
| 5,465,243 | A | 11/1995 | Boardman et al. |
| 5,519,554 | A | 5/1996 | Todd et al. |
| 5,585,978 | A | 12/1996 | Rottenburg et al. |
| 5,646,806 | A | 7/1997 | Griffith et al. |
| 5,883,868 | A | 3/1999 | Iwanaga |
| 5,889,744 | A | 3/1999 | Iwanaga |
| 5,953,482 | A | 9/1999 | Suzuki et al. |
| 6,061,199 | A | 5/2000 | Goker et al. |
| 6,075,678 | A * | 6/2000 | Saliba ............ 360/291 |
| 6,075,759 | A | 6/2000 | Yanagawa et al. |
| 6,088,183 | A | 7/2000 | Nelson |
| 6,108,165 | A | 8/2000 | Maruyama et al. |
| 6,141,312 | A | 10/2000 | Masters et al. |
| 6,188,535 | B1 | 2/2001 | Lemke et al. |
| 6,285,519 | B1 | 9/2001 | Goker |
| 6,297,927 | B1 | 10/2001 | Rudi |
| 6,304,397 | B1 | 10/2001 | Ozue et al. |
| 6,442,126 | B1 | 8/2002 | Marchant et al. |
| 6,614,731 | B2 | 9/2003 | Ishii |
| 6,661,616 | B2 | 12/2003 | Yasukochi |
| 6,856,484 | B2 | 2/2005 | Johnson et al. |
| 6,940,682 | B2 | 9/2005 | Bui et al. |
| 7,050,265 | B2 | 5/2006 | Kondo et al. |
| 7,062,682 | B2 | 6/2006 | Ozaki |
| 7,133,262 | B1 | 11/2006 | Nayak |
| 7,324,297 | B2 * | 1/2008 | Evans et al. ............ 360/69 |
| 8,014,246 | B2 | 9/2011 | Mahnad |
| 8,077,566 | B2 * | 12/2011 | Mahnad ............ 369/47.14 |
| 8,174,950 | B2 * | 5/2012 | Ritter et al. ............ 369/97 |
| 8,225,339 | B1 * | 7/2012 | Madison et al. ............ 720/658 |
| 2003/0043498 | A1 | 3/2003 | Johnson et al. |
| 2007/0047395 | A1 | 3/2007 | Skeeter et al. |
| 2007/0143659 | A1 * | 6/2007 | Ball ............ 714/755 |
| 2007/0206477 | A1 | 9/2007 | Raniuk et al. |
| 2007/0222096 | A1 * | 9/2007 | Slafer ............ 264/2.1 |
| 2011/0141863 | A1 | 6/2011 | Mahnad |
| 2013/0235708 | A1 | 9/2013 | Wilson |

FOREIGN PATENT DOCUMENTS

| | | |
|---|---|---|
| JP | 06-290401 | 10/1994 |
| JP | 07-098828 | 4/1995 |
| WO | 9202014 | 2/1992 |
| WO | WO 02/09099 | 1/2002 |
| WO | 2007092785 | 8/2007 |
| WO | 2007092785 A2 | 8/2007 |

OTHER PUBLICATIONS

Optical Disc Drive, Wikipedia.org, Mar. 30, 2011, pp. 1-4.
Helical scan, Wikipedia.org, Feb. 2, 2009, pp. 1-2.
Blu-ray disc, Wikipedia.org, Mar. 29, 2011, pp. 1-10.
International Search Report for PCT/US2012/041996 dated Oct. 25, 2012.
Office Action for U.S. Appl. No. 13/670,744 dated May 21, 2013.
Final Office Action for U.S. Appl. No. 13/670,744 dated Sep. 5, 2013.
Office Action for U.S. Appl. No. 13/622,607 dated Sep. 12, 2013.
European Patent Office, International Search Report and the Written Opinion for International Application No. PCT/US2013/068489 mailed Feb. 26, 2014.
European Patent Office, International Search Report and the Written Opinion for International Application No. PCT/US2013/068660 mailed Feb. 26, 2014.
United States Patent and Trademark Office, Notice of Allowance and Fee(s) Due for U.S. Appl. No. 13/670,688 mailed Mar. 14, 2014.
Office Action for U.S. Appl. No. 13/670,688 dated Oct. 23, 2013.
Notice of Allowance for U.S. Appl. No. 13/670,744 dated Sep. 18, 2013.
International Search Report and Written Opinion for International Application PCT/US2013/068646 dated Feb. 24, 2014 (13 pages total).
Notice of Allowance for U.S. Appl. No. 13/670,744 dated Mar. 19, 2014.
European Patent Office, The International Searching Authority, The International Search Report for PCT/US2013/068660 mailed Feb. 25, 2014.
European Patent Office, The International Searching Authority, The International Search Report for PCT/US2013/068489 mailed Feb. 26, 2014.
Office Action for U.S. Appl. No. 13/622,607 mailed May 7, 2014.
Notice of Allowance for U.S. Appl. No. 14/127,028 mailed Jul. 17, 2014.
Office Action for U.S. Appl. No. 14/127,028 dated Apr. 7, 2014.

* cited by examiner

ROTARY HEAD DATA STORAGE AND RETRIEVAL SYSTEM AND METHOD FOR DATA VERIFICATION

TECHNICAL FIELD

The following relates to a system and method for data storage and retrieval utilizing a tape medium and a rotary head and providing for data verification.

BACKGROUND

Magnetic and optical tape media are frequently used for long-term storage of large quantities of data, such as in data backup or archive operations. Typical tape data storage and retrieval methods involve recording or writing data in tracks running length-wise down the tape, as well as retrieving or reading such data tracks from the tape. A multiple stripe head is used to write and/or read many parallel tracks. Magnetic heads may have more than 96 tracks with the ability to jog along the width of a magnetic tape to write and/or read more tracks. Optical tape data storage and retrieval systems using laser heads operate in a similar fashion.

The multiple stripe head designs mentioned above become inefficient as tape length is increased for greater capacity, such as in archive operations, because of the increased time it takes to access the data stored at the end of the tape. While shorter tapes result in quicker access time than longer tapes, shorter tape lengths also result in more limited storage capacity, thereby hindering archive operations where large data quantities are involved. A wide tape to boost capacity requires many more transducers in the head. Data throughput is also a factor of tape width and the number of heads. Limits to multiple stripe head designs include the number of read and write heads and overall tape width.

When data is written to a storage medium it is also desirable to read back the information in order to verify data integrity and correct errors that may have occurred in the recording process. Typical optical recorders (DVD, etc) are not designed to perform this function, as the phase change media is not easily read back using a single laser element.

Thus, there exists a need for an improved tape media data storage system and method. Such a system and method would include a rotary head design, wherein multiple head elements available on a rotating head carriage assembly can be used to verify data as it is recorded. Existing write heads would be utilized in a read mode in order to check data without requiring additional dedicated read heads.

SUMMARY

According to one embodiment disclosed herein, a data storage and retrieval system is provided. The system comprises a head carriage unit having a plurality of optical heads disposed at a working surface, the head carriage unit adapted for rotational motion. The system further comprises a tape drive unit configured to move an optical tape media past the working surface of the head carriage unit.

As the head carriage unit rotates and the tape moves past the working surface, a first one of the plurality of optical heads is configured to write a data track to the tape and a second one of the plurality of optical heads is configured to thereafter read the data track. Data read by the second one of the plurality of heads is for use in verifying data integrity and performing error correction.

According to another embodiment disclosed herein, a data storage and retrieval system is provided. The system comprises a head carriage unit having a plurality of heads disposed at a working surface, the head carriage unit adapted for rotational motion. The system further comprises a tape drive unit configured to move a tape media past the working surface of the head carriage unit, the tape media having a width approximately equal to a width of the working surface of the head carriage unit.

As the head carriage unit rotates and the tape moves past the working surface, a first one of the plurality of heads is configured to write a data track to the tape and a second one of the plurality of heads is configured to thereafter read the data track. Data read by the second one of the plurality of heads is for use in verifying data integrity and performing error correction.

According to still another embodiment disclosed herein, a data storage and retrieval method is provided. The method comprises rotating a head carriage unit having a plurality of optical heads disposed at a working surface, and moving an optical tape media past the working surface of the head carriage unit. The method further comprises writing a data track to the tape using a first one of the plurality of optical heads as the head carriage unit rotates and the tape moves past the working surface. The method still further comprises reading the data track using a second one of the plurality of optical heads as the head carriage unit rotates and the tape moves past the working surface, wherein data read by the second one of the plurality of heads is for use in data integrity verification and error correction.

A detailed description of these embodiments and accompanying drawings is set forth below.

DETAILED DESCRIPTION

Figure 1:
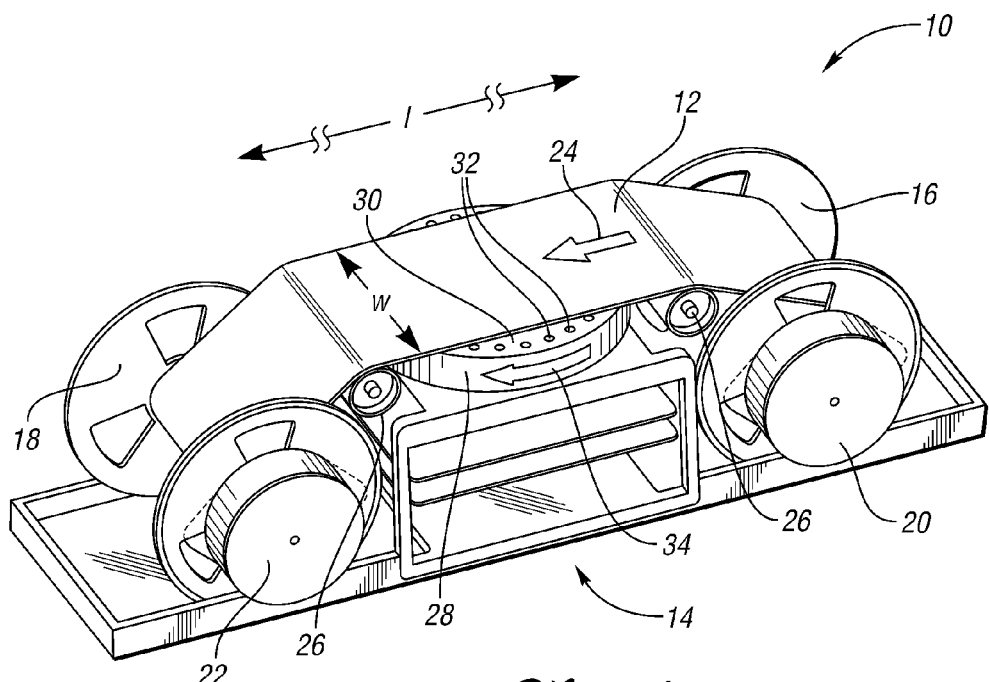
FIG. 1 is a perspective view of an embodiment of the data storage and retrieval system disclosed herein.

With reference to FIGS. 1-4, a data storage and retrieval system and method utilizing a tape media and a rotary head will be described. For ease of illustration and to facilitate understanding, like reference numerals have been used herein for similar components and features throughout the drawings.

As previously described, magnetic and optical tape media are frequently used for long-term storage of large quantities of data, such as in data backup or archive operations. Typical tape data storage and retrieval methods involve recording or writing data in tracks running length-wise down the tape, as well as retrieving or reading such data tracks from the tape. A multiple stripe head is used in magnetic tape storage and retrieval systems to write and/or read many parallel tracks, with the head having the ability to jog along the width of the tape to write and/or read more tracks. Optical tape storage and retrieval systems using laser heads operate in a similar fashion.

Multiple stripe head designs become inefficient, however, as tape length is increased for greater capacity because of the increased time it takes to access the data stored at the end of the tape. Shorter tape lengths result in quicker access time than longer tape lengths, but also result in more limited data storage capacity. A wide tape to boost capacity requires many more transducers in the head. Data throughput is also a factor of tape width and the number of heads. Limits to multiple stripe head designs include the number of heads and overall tape width.

Performing a read operation after a write operations is also a desirable function. When data is written to a storage medium it is desirable to read back the information in order to verify data integrity and correct errors that may have occurred in the recording process. Typical optical recorders (DVD, etc) are not designed to perform this function, as the phase change media is not easily read back using a single laser element.

An improved tape media data storage system and method as disclosed herein include a rotary head design, wherein multiple head elements available on a rotating head carriage assembly can be used to verify data as it is recorded. Existing write heads are utilized in a read mode in order to check data without requiring additional dedicated read heads. With write elements also functioning as read elements, cost and complexity savings may be achieved. As well, duty-cycle and read/write performance may be enhanced.

Referring now to FIG. 1, a perspective view of an embodiment of the data storage and retrieval system disclosed herein is shown. The system 10 comprises tape drive unit and a head carriage unit. The tape drive unit comprise a tape media 12, which may be an optical tape, and a supporting servo drive system 14. The tape media 12 may be supplied on a supply reel 16 and can be transferred to a take-up reel 18 by servo action of a supply reel drive motor 20 and take-up reel drive motor 22. The two motors 20, 22 may act in unison to provide smooth movement of the tape 12 along a tape path.

As can be seen in FIG. 1, the tape media 12 has a width (w) as well as a length (l) stretching from respective ends of the tape 12, which ends are attached (not shown) to the supply and take-up reels 16, 18. The tape 12 travels in a direction shown by arrow 24 along the tape path. The tape path has a series of guide rollers 26, which help to provide control of the tape 12 as it is driven past a head assembly 28. A servo control system (not shown) may be used to provide closed loop motion control for the tape 12 and accurately control the tape tension and position with respect to the head assembly 28.

As also seen in FIG. 1, the head assembly 28 may be substantially disc-shaped, including a substantially circular and substantially planar working surface 30 proximate the tape media 12. The head assembly 28 may include multiple heads 32 for recording and/or reading data to and/or from the tape media 12. In that regard, the head assembly 28 rotates during operation in a direction shown by arrow 34 as the tape media 12 moves in a direction shown by arrow 24. The rotary head data storage and retrieval system of FIG. 1 is further described, together with additional features, components, operations, functions and methods, in U.S. Pat. No. 8,225,339 and U.S. patent application Ser. No. 13/622,607, the disclosures of which are incorporated herein by reference in their entireties.

Figure 2:
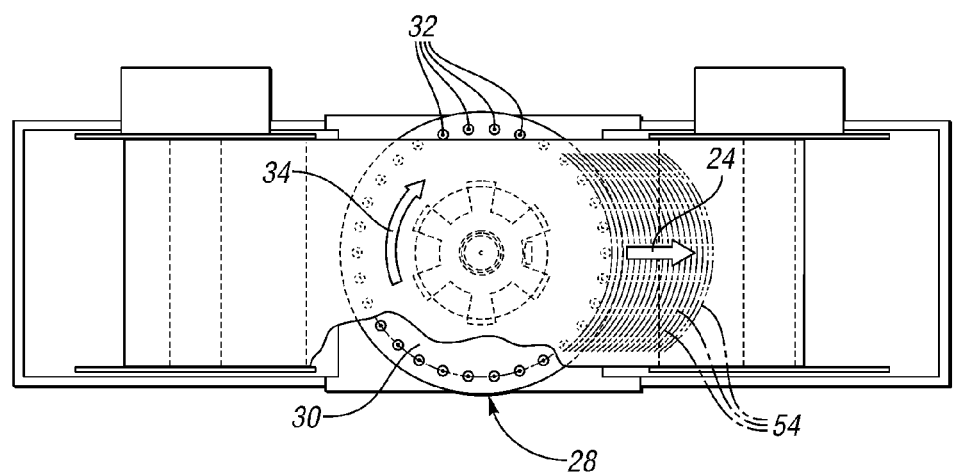
FIG. 2 is a top view of an embodiment of the data storage and retrieval system disclosed herein.
Figure 3:
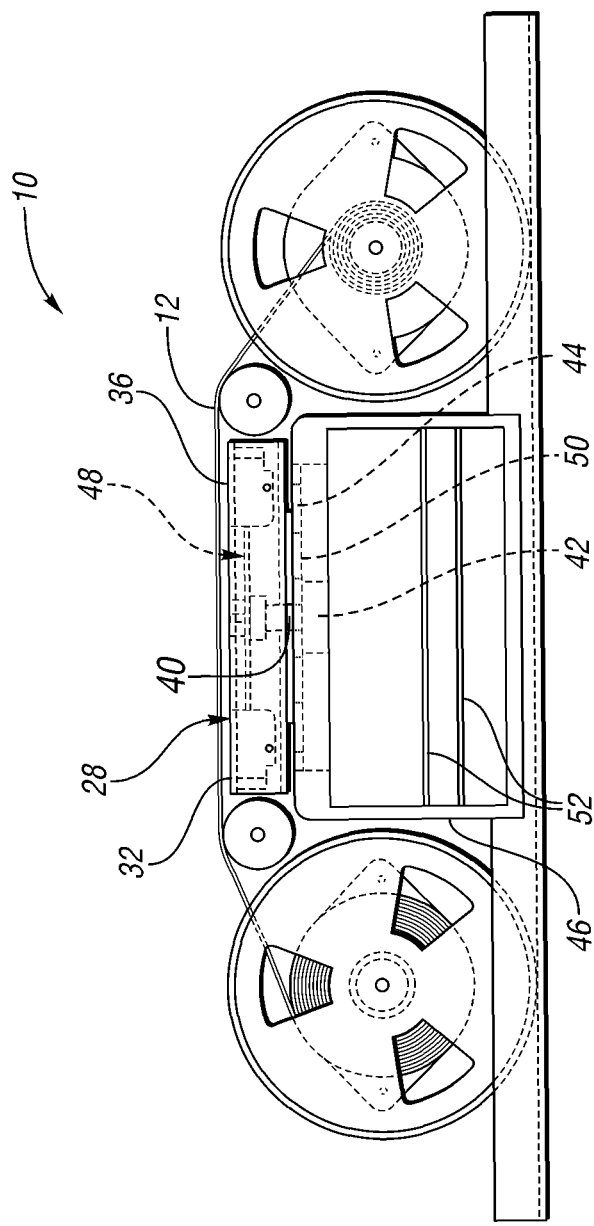
FIG. 3 is a side view of an embodiment of the data storage and retrieval system disclosed herein.

Referring next to FIGS. 2 and 3, top and side views of an embodiment of the data storage and retrieval system disclosed herein are shown. As seen therein, the head assembly 28 may be built upon a head carriage unit. The carriage unit may hold multiple Optical Pickup Unit (OPU) laser assemblies 32, which perform the actual writing/reading or recording/retrieval of data to/from an optical tape 12. While a particular number of OPUs 32 are illustrated in FIG. 2, any number of OPU assemblies 32 may be used. As well, OPUs 32 may be similar assemblies as those used in Blu-Ray disc drives.

As seen in FIG. 2, the OPU assemblies 32 may be located radially on the rotating head carriage 28 at a fixed radius in a substantially circular pattern. Such positioning of the OPU assemblies 32 can ensure that as the head assembly 28 rotates in the direction shown by arrow 34 and the tape 12 moves in the direction shown by arrow 24, the optical beams from each OPU 32' transcribe substantially equal radius arcs onto the tape media 12.

The rotatable head assembly 28 may be mounted underneath the tape media 12. A spindle shaft 40 may be provided for support of the rotatable head assembly 28. The head assembly 28 may be driven to rotate by a head drive motor 42, which may be built into the head assembly 28. In that regard, passive rotor magnets 44 associated with the rotating head assembly 28 may be driven by commutation of stator coils (not shown) fixed in the tape drive base 46.

Referring to FIG. 3, a head assembly circuit board 48 may be provided to control the function of OPU assemblies 32, as well as data communication. Power may be supplied to the head circuitry 48 through an inductive coupling 50. Data signals to and from the OPU assemblies 32 may be sent through the inductive coupling 50. Motor control and further data signal processing may be performed by circuit boards 52, which may be located in the tape drive base 46.

Still referring to FIG. 3, the tape media 12 travels in a path that passes over the head assembly 28 in the direction shown by arrow 24. The head assembly 28 also rotates in the direction illustrated by arrow 34. The passage of optical beams from each OPU 32 past the tape media 12 may transcribe data tracks of recorded spots in substantially similar approximate arcs 54 on the tape media 12. The arcs 54 are only approximate in radius in that the movement of the tape media 12 past the heads 32 will skew the data tracks recorded from true arcs to elongated arcs 54 in proportion to the speed of the rotating heads 32 and the speed of the moving tape 12.

A servo control method and system (not shown) may also be provided to control the speed of the tape media 12 in such a way that the rotating laser spots from OPU assemblies 38 will individually write data tracks 54 with spacing set apart from one another as a function of the velocities of the tape media 12 and the rotating head assembly 28. In that regard, the relative speeds between tape media 12 and head assembly 28 can be large, with the speed of the head assembly 28 emulating the recording speed of a Blu-Ray DVD, while the speed of the tape media 12 can be quite slow. As a result, by moving both the tape media 12 and the recording heads 32, the data storage system and method disclosed herein having a rotating head assembly 28 may provide for very high data rates and very large storage capacity.

As previously noted, the head carriage assembly 28 may be substantially disc-shaped, and may include a substantially circular and substantially planar working surface 30 proximate the tape media 12. It should be noted, however, that the head assembly 28 and working surface 30 may have different shapes and/or configurations. As well, OPU assemblies 32 may comprise servo subsystems for controlling movement of the OPUs 32 relative to the tape medium 12 and the head carriage assembly 28, including radial movement of the OPUs 32 at the working surface 30 of the head carriage assembly 28.

According to the system 10 and method disclosed herein, each OPU 32 may be used in a read-after-write mode to verify data integrity. That is, each OPU 32 may operate to both write data to and read data from the tape medium 12. In such a fashion, the rotary head assembly 28 with multiple laser OPUs 32 takes advantage of consecutive active OPUs 32 to read a data track immediately after the data track has been written to the tape medium 12.

Referring now to FIGS. 1-3, as previously described, a head carriage unit 28 adapted for rotational motion may comprise a plurality of heads 32 disposed at a working surface 30. A tape drive unit may be configured to move a tape media 12 past the working surface 30 of the head carriage unit 28, and the tape media 12 may have a width (w) approximately equal to a width of the working surface 30 of the head carriage unit 28. As the head carriage unit 28 rotates and the tape 12 moves past the working surface 30, a first head 32 may be adapted, configured and/or positioned to write a data track 54 to the tape 12 and a second head 32 may be adapted, configured and/or positioned to thereafter read the data track 54. Data read by the second head 32 is for use in verifying data integrity and performing error correction.

As previously described, each of the plurality of heads 32 may be an optical head and the tape media may be an optical tape. The heads 32 may be adapted, configured and/or positioned to write data tracks 54 to and read data tracks 54 from the tape media 12. The head carriage unit 28 may be substantially disc shaped, the working surface 30 may be substantially circular, and the plurality of heads 32 may be arrayed in a circle on the working surface 30. The second head 32 adapted, configured and/or positioned to read the data track 54 after the data track 54 has been written may be located on the working surface 30 immediately adjacent the first head 32 adapted, configured and/or positioned to write the data track 54.

It should be noted, however, that the second head 32 adapted, configured and/or positioned to read the data track 54 after the data track 54 has been written need not be located on the working surface immediately adjacent the first head 32. In that regard, the second head 32 adapted, configured and/or positioned to read the data track 54 may be any other head 32 following the first head 32 adapted, configured and/or positioned to write the data track 54 as the head assembly 28 rotates. That is, a third, fourth or any other head 32 after the head 32 adapted, configured and/or positioned to write the data track 54 may be utilized to thereafter read the data track 54 for use in verifying data integrity and performing error correction. As well, multiple heads 32 may be utilized to read the data track 54, redundantly, after the data track 54 has been written by the first head 32.

As also previously described, each of the plurality of heads 32 may be adapted or configured for radial movement with respect to the head carriage unit 28 at the working surface 30, such as by a servo subsystem. Alternatively, the plurality of heads 32 at the working surface 30 may comprise first and second concentric circles of heads 32, the first circle having a diameter less than a diameter of the second circle. The first one of the plurality of heads 32 adapted, configured and/or positioned to write a data track 54 may be located in the first circle of heads 32, and the second one of the plurality of heads 32 adapted, configured and/or positioned to read the data track 54 after the data track 54 has been written may be located in the second circle of heads 32. The tape media 12 may have a width (w) less than a diameter of the circle of the plurality of heads 32, or alternatively may have a width (w) greater than a diameter of the circle of the plurality of heads 32.

Figure 4:
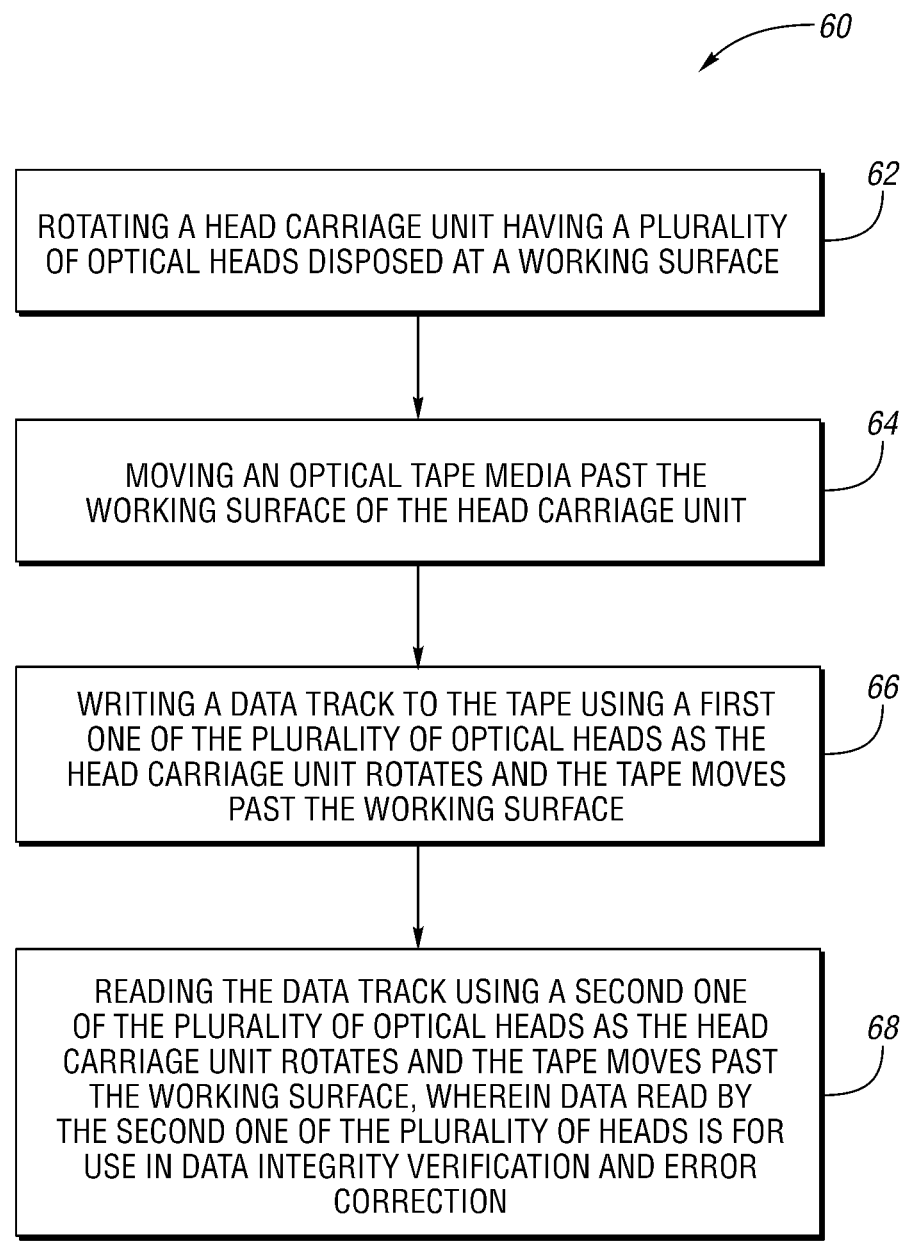
FIG. 4 is a simplified flowchart depicting an embodiment of the data storage and retrieval method disclosed herein.

Referring next to FIG. 4, simplified flowchart of an embodiment of the data storage and retrieval method 60 disclosed herein is shown. As seen therein, the method 60 may comprise rotating 62 a head carriage unit having a plurality of optical heads disposed at a working surface, and moving 64 an optical tape media past the working surface of the head carriage unit.

The method 60 may further comprise writing 66 a data track to the tape using a first one of the plurality of optical heads as the head carriage unit rotates and the tape moves past the working surface, and reading 68 the data track using a second one of the plurality of optical heads as the head carriage unit rotates and the tape moves past the working surface. Data read by the second one of the plurality of heads is for use in data integrity verification and error correction.

Once again, as described previously in connection with FIGS. 1-3, according to an embodiment of the data storage method disclosed herein, each of the plurality of heads may be adapted, configured and/or positioned to write data tracks 54 to and read data tracks 54 from the tape media 12. The head carriage unit 28 may be substantially disc shaped, the working surface 30 may be substantially circular, and the plurality of heads 32 may be arrayed in a circle on the working surface 30. The second head 32 adapted, configured and/or positioned to read the data track 54 after the data track 54 has been written may be located on the working surface 30 immediately adjacent the first head 32 adapted, configured and/or positioned to write the data track 54.

As also described above in connection with FIGS. 1-3, according to the data storage method disclosed herein, each of the plurality of heads may be adapted or configured for radial movement with respect to the head carriage unit at the working surface, such as by a servo subsystem. Alternatively, the plurality of heads 32 at the working surface 30 may comprise first and second concentric circles of heads 32, the first circle having a diameter less than a diameter of the second circle. The first one of the plurality of heads 32 adapted, configured and/or positioned to write a data track 54 may be located in the first circle of heads 32, and the second one of the plurality of heads 32 adapted, configured and/or positioned to read the data track 54 after the data track 54 has been written may be located in the second circle of heads 32. The tape media may have a width (w) less than or greater than a diameter of the circle of the plurality of optical heads 32.

As is apparent from the foregoing description, an improved tape media data storage and retrieval system and method having a rotary head design is provided. Multiple head elements available on a rotating head carriage assembly may be used to verify data as it is recorded. Existing write heads are utilized in a read mode in order to check data without requiring additional dedicated read heads. With write elements also functioning as read elements, cost and complexity savings may be achieved, and duty-cycle and read/write performance may be enhanced.

While certain embodiments of a data storage and retrieval system and method utilizing a tape media and a rotary head have been illustrated and described herein, they are exemplary only and it is not intended that these embodiments illustrate and describe all those possible. Rather, the words used herein are words of description rather than limitation, and it is understood that various changes may be made without departing from the spirit and scope of the following claims.

What is claimed is:

1. A data storage and retrieval system comprising:
a head carriage unit having a plurality of optical heads disposed at a working surface, the head carriage unit adapted for rotational motion about a point and each of the plurality of heads configured for radial movement at the working surface relative to the point; and
a tape drive unit configured to move an optical tape media past the working surface of the head carriage unit;
wherein, when the head carriage unit rotates and the tape moves past the working surface, a first one of the plurality of optical heads is configured to write a data track to the tape and a second one of the plurality of optical heads is configured to thereafter read the data track, wherein data read by the second one of the plurality of heads is used in verifying data integrity and performing error correction.

2. The system of claim 1 wherein each of the plurality of optical heads is configured to write data tracks to and read data tracks from the optical tape media.

3. The system of claim 1 wherein the head carriage unit is substantially disc shaped, the working surface is substantially circular, and the plurality of heads are arrayed in a circle on the working surface.

4. The system of claim 3 wherein the second one of the plurality of optical heads is located on the working surface immediately adjacent the first one of the plurality of optical heads.

5. The system of claim 3 wherein the tape media has a width less than a diameter of the circle of the plurality of optical heads.

6. The system of claim 3 wherein the tape media has a width greater than a diameter of the circle of the plurality of optical heads.

7. A data storage and retrieval system comprising:
a head carriage unit having a plurality of heads disposed at a working surface, the head carriage unit adapted for rotational motion about a point and each of the plurality of heads configured for radial movement at the working surface relative to the point; and
a tape drive unit configured to move a tape media past the working surface of the head carriage unit, the tape media having a width approximately equal to a width of the working surface of the head carriage unit;
wherein, when the head carriage unit rotates and the tape moves past the working surface, a first one of the plurality of heads is configured to write a data track to the tape and a second one of the plurality of heads is configured to thereafter read the data track, wherein data read by the second one of the plurality of heads is used in verifying data integrity and performing error correction.

8. The system of claim 7 wherein the plurality of heads comprise optical heads and the tape media comprises optical tape, and wherein each of the plurality of optical heads is configured to write data tracks to and read data tracks from the optical tape.

9. The system of claim 7 wherein the head carriage unit is substantially disc shaped, the working surface is substantially circular, and the plurality of heads are arrayed in a circle on the working surface.

10. The system of claim 9 wherein the second one of the plurality of heads is located on the working surface immediately adjacent the first one of the plurality of heads.

11. The system of claim 9 wherein the tape media has a width less than a diameter of the circle of the plurality of heads.

12. The system of claim 9 wherein the tape media has a width greater than a diameter of the circle of the plurality of heads.

13. A data storage and retrieval method comprising:
rotating a head carriage unit about a point, the head carriage unit having a plurality of optical heads disposed at a working surface;
moving an optical tape media past the working surface of the head carriage unit;
writing a data track to the tape using a first one of the plurality of optical heads as the head carriage unit rotates and the tape moves past the working surface; and
reading the data track using a second one of the plurality of optical heads as the head carriage unit rotates and the tape moves past the working surface, wherein data read by the second one of the plurality of heads is for use in data integrity verification and error correction;
wherein writing and/or reading comprises moving the first and/or second optical head radially relative to the point.

14. The method of claim 13 wherein each of the plurality of optical heads is configured to write data tracks to and read data tracks from the optical tape media.

15. The method of claim 13 wherein the head carriage unit is substantially disc shaped, the working surface is substantially circular, the plurality of heads are arrayed in a circle on the working surface, and the second one of the plurality of optical heads is located on the working surface immediately adjacent the first one of the plurality of optical heads.

16. The method of claim 15 wherein each of the plurality of heads is configured for radial movement with respect to the head carriage unit at the working surface.

17. The method of claim 15 wherein the tape media has a width less than a diameter of the circle of the plurality of optical heads.

18. The method of claim 15 wherein the tape media has a width greater than a diameter of the circle of the plurality of optical heads.

* * * * *